United States Patent
Clawson

(10) Patent No.: US 8,396,191 B2
(45) Date of Patent: Mar. 12, 2013

(54) ANTI-SOCIAL PROTOCOL FOR EMERGENCY DISPATCH

(76) Inventor: Jeffrey J. Clawson, Salt Lake City, UT (US)

( * ) Notice: Subject to any disclaimer, the term of this patent is extended or adjusted under 35 U.S.C. 154(b) by 288 days.

(21) Appl. No.: 13/026,055

(22) Filed: Feb. 11, 2011

(65) Prior Publication Data

US 2012/0207286 A1     Aug. 16, 2012

(51) Int. Cl.
*H04M 11/00*     (2006.01)
(52) U.S. Cl. ......... 379/45; 379/42; 379/37; 379/201.01; 379/201.03
(58) Field of Classification Search .............. 379/37–49, 379/201.01, 201.3; 340/505, 539.1, 539.13, 340/540, 5.61, 825.09
See application file for complete search history.

(56) References Cited

U.S. PATENT DOCUMENTS

| | | | |
|---|---|---|---|
| 3,799,147 A | 3/1974 | Adolph et al. |
| 4,130,881 A | 12/1978 | Haessler et al. |
| 4,164,320 A | 8/1979 | Irazoqui et al. |
| 4,237,344 A | 12/1980 | Moore |
| 4,290,114 A | 9/1981 | Sinay |
| 4,338,493 A | 7/1982 | Stenhuis et al. |
| 4,360,345 A | 11/1982 | Hon |
| 4,455,548 A | 6/1984 | Burnett |
| 4,489,387 A | 12/1984 | Lamb et al. |
| 4,731,725 A | 3/1988 | Suto et al. |
| 4,839,822 A | 6/1989 | Dormond et al. |
| 4,858,121 A | 8/1989 | Barber et al. |
| 4,865,549 A | 9/1989 | Sonsteby |
| 4,922,514 A | 5/1990 | Bergeron et al. |
| 4,926,495 A | 5/1990 | Comroe et al. |
| 4,945,476 A | 7/1990 | Bodick et al. |
| 4,967,754 A | 11/1990 | Rossi |
| 5,063,522 A | 11/1991 | Winters |
| 5,065,315 A | 11/1991 | Garcia |
| 5,072,383 A | 12/1991 | Brimm et al. |

(Continued)

FOREIGN PATENT DOCUMENTS

| | | |
|---|---|---|
| JP | 2003-109162 A | 4/2003 |
| JP | 2003-187003 A | 7/2003 |

(Continued)

OTHER PUBLICATIONS

Office Action for U.S. Appl. No. 12/396,201, filed Mar. 2, 2009 and mailed from USPTO on Mar. 8, 2011, 23 pgs.

(Continued)

*Primary Examiner* — Melur Ramakrishnaiah
(74) *Attorney, Agent, or Firm* — John R. Thompson; Stoel Rives LLP

(57) ABSTRACT

Systems and methods are provided to guide an emergency dispatcher in responding to emergency calls involving a hate crime or other anti-social behavior. The systems and methods can include an emergency police dispatch protocol configured to facilitate uniform and consistent gathering of information about an incident being reported. The emergency police dispatch protocol includes one or more dispatch protocols configured for particular incidents or emergency situations, such as to aid the dispatcher in processing calls relating to anti-social behavior. The emergency police dispatch protocol presents a pre-scripted interrogation, including pre-programmed inquiries for a dispatcher to ask the caller. The pre-scripted interrogation of the dispatch protocol facilitates uniform and consistent gathering of information relating to hate crimes and other anti-social behavior. The information gathered can be stored and/or processed to determine a determinant value corresponding to an appropriate emergency dispatch response.

19 Claims, 9 Drawing Sheets

U.S. PATENT DOCUMENTS

| | | | |
|---|---|---|---|
| 5,077,666 | A | 12/1991 | Brimm et al. |
| 5,086,391 | A | 2/1992 | Chambers |
| 5,109,399 | A | 4/1992 | Thompson |
| 5,122,959 | A | 6/1992 | Nathanson et al. |
| 5,193,855 | A | 3/1993 | Shamos |
| 5,228,449 | A | 7/1993 | Christ et al. |
| 5,253,164 | A | 10/1993 | Holloway et al. |
| 5,255,187 | A | 10/1993 | Sorensen |
| 5,291,399 | A | 3/1994 | Chaco |
| 5,323,444 | A | 6/1994 | Ertz et al. |
| 5,339,351 | A | 8/1994 | Hoskinson et al. |
| 5,348,008 | A | 9/1994 | Bornn et al. |
| 5,379,337 | A | 1/1995 | Castillo et al. |
| 5,404,292 | A | 4/1995 | Hendrickson |
| 5,410,471 | A | 4/1995 | Alyfuku et al. |
| 5,423,061 | A | 6/1995 | Fumarolo et al. |
| 5,438,996 | A | 8/1995 | Kemper et al. |
| 5,441,047 | A | 8/1995 | David et al. |
| 5,462,051 | A | 10/1995 | Oka et al. |
| 5,471,382 | A | 11/1995 | Tallman et al. |
| 5,502,726 | A | 3/1996 | Fischer |
| 5,513,993 | A | 5/1996 | Lindley et al. |
| 5,516,702 | A | 5/1996 | Senyei et al. |
| 5,521,812 | A | 5/1996 | Feder et al. |
| 5,536,084 | A | 7/1996 | Curtis et al. |
| 5,544,649 | A | 8/1996 | David et al. |
| 5,554,031 | A | 9/1996 | Moir et al. |
| 5,590,269 | A | 12/1996 | Kruse et al. |
| 5,594,638 | A | 1/1997 | Iliff |
| 5,594,786 | A | 1/1997 | Chaco et al. |
| 5,596,994 | A | 1/1997 | Bro |
| 5,630,125 | A | 5/1997 | Zellweger |
| 5,636,873 | A | 6/1997 | Sonsteby |
| 5,650,995 | A | 7/1997 | Kent |
| 5,660,176 | A | 8/1997 | Iliff |
| 5,675,372 | A | 10/1997 | Aguayo, Jr. et al. |
| 5,682,419 | A | 10/1997 | Grube et al. |
| 5,684,860 | A | 11/1997 | Milani et al. |
| 5,689,229 | A | 11/1997 | Chaco et al. |
| 5,719,918 | A | 2/1998 | Serbetciouglu et al. |
| 5,722,418 | A | 3/1998 | Bro |
| 5,724,983 | A | 3/1998 | Selker et al. |
| 5,734,706 | A | 3/1998 | Windsor et al. |
| 5,745,532 | A | 4/1998 | Campana, Jr. |
| 5,748,907 | A | 5/1998 | Crane |
| 5,754,960 | A | 5/1998 | Downs et al. |
| 5,759,044 | A | 6/1998 | Redmond |
| 5,761,278 | A | 6/1998 | Pickett et al. |
| 5,761,493 | A | 6/1998 | Blakeley et al. |
| 5,787,429 | A | 7/1998 | Nikolin, Jr. |
| 5,805,670 | A | 9/1998 | Pons et al. |
| 5,809,493 | A | 9/1998 | Ahamed et al. |
| 5,822,544 | A | 10/1998 | Chaco et al. |
| 5,823,948 | A | 10/1998 | Ross, Jr. et al. |
| 5,826,077 | A | 10/1998 | Blakeley et al. |
| 5,832,187 | A | 11/1998 | Pedersen et al. |
| 5,842,173 | A | 11/1998 | Strum et al. |
| 5,844,817 | A | 12/1998 | Lobley et al. |
| 5,850,611 | A | 12/1998 | Krebs |
| 5,857,966 | A | 1/1999 | Clawson |
| 5,901,214 | A | 5/1999 | Shaffer et al. |
| 5,902,234 | A | 5/1999 | Webb |
| 5,910,987 | A | 6/1999 | Ginter et al. |
| 5,912,818 | A | 6/1999 | McGrady et al. |
| 5,915,019 | A | 6/1999 | Ginter et al. |
| 5,926,526 | A | 7/1999 | Rapaport et al. |
| 5,933,780 | A | 8/1999 | Connor et al. |
| 5,961,446 | A | 10/1999 | Beller et al. |
| 5,962,891 | A | 10/1999 | Arai |
| 5,964,700 | A | 10/1999 | Tallman et al. |
| 5,986,543 | A | 11/1999 | Johnson |
| 5,989,187 | A | 11/1999 | Clawson |
| 5,991,730 | A | 11/1999 | Lubin et al. |
| 5,991,751 | A | 11/1999 | Rivette et al. |
| 6,004,266 | A | 12/1999 | Clawson |
| 6,010,451 | A | 1/2000 | Clawson |
| 6,022,315 | A | 2/2000 | Iliff |
| 6,035,187 | A | 3/2000 | Franza |
| 6,040,770 | A | 3/2000 | Britton |
| 6,052,574 | A | 4/2000 | Smith, Jr. |
| 6,053,864 | A | 4/2000 | Clawson |
| 6,058,179 | A | 5/2000 | Shaffer et al. |
| 6,074,345 | A | 6/2000 | van Oostrom et al. |
| 6,076,065 | A | 6/2000 | Clawson |
| 6,078,894 | A | 6/2000 | Clawson et al. |
| 6,106,459 | A | 8/2000 | Clawson |
| 6,112,083 | A | 8/2000 | Sweet et al. |
| 6,115,646 | A | 9/2000 | Fiszman et al. |
| 6,117,073 | A | 9/2000 | Jones et al. |
| 6,118,866 | A | 9/2000 | Shtivelman |
| 6,127,975 | A | 10/2000 | Maloney |
| 6,134,105 | A | 10/2000 | Lueker |
| 6,292,542 | B1 | 9/2001 | Bilder |
| 6,370,234 | B1 | 4/2002 | Kroll |
| 6,535,121 | B2 | 3/2003 | Matheny |
| 6,594,634 | B1 | 7/2003 | Hampton et al. |
| 6,607,481 | B1 | 8/2003 | Clawson |
| 6,610,012 | B2 | 8/2003 | Mault |
| 6,696,956 | B1 | 2/2004 | Uchida et al. |
| 6,879,819 | B2 | 4/2005 | Brooks |
| 6,901,397 | B1 | 5/2005 | Moldenhauer et al. |
| 6,931,112 | B1 | 8/2005 | McFarland et al. |
| 6,968,375 | B1 | 11/2005 | Brown |
| 7,106,835 | B2 | 9/2006 | Saalsaa |
| 7,289,944 | B1 | 10/2007 | Genovese |
| 7,428,301 | B1 | 9/2008 | Clawson |
| 7,436,937 | B2 | 10/2008 | Clawson |
| 7,645,234 | B2 | 1/2010 | Clawson |
| 7,703,020 | B2 | 4/2010 | Bhattaru |
| 7,783,586 | B2 | 8/2010 | Friedlander et al. |
| 7,978,826 | B2 * | 7/2011 | Salafia et al. ............... 379/37 |
| 8,294,570 | B2 * | 10/2012 | Clawson .............. 340/539.12 |
| 2002/0004729 | A1 | 1/2002 | Zak et al. |
| 2002/0106059 | A1 | 8/2002 | Kroll et al. |
| 2003/0028536 | A1 | 2/2003 | Singh et al. |
| 2003/0050538 | A1 | 3/2003 | Naghavi et al. |
| 2003/0187615 | A1 | 10/2003 | Epler et al. |
| 2003/0195394 | A1 | 10/2003 | Saalsaa |
| 2003/0212575 | A1 | 11/2003 | Saalsaa et al. |
| 2006/0059423 | A1 | 3/2006 | Lehmann et al. |
| 2006/0122520 | A1 | 6/2006 | Banet et al. |
| 2006/0167346 | A1 | 7/2006 | Sarel |
| 2006/0173500 | A1 | 8/2006 | Walker et al. |
| 2006/0178908 | A1 | 8/2006 | Rappaport |
| 2006/0212315 | A1 | 9/2006 | Wiggins |
| 2007/0055559 | A1 | 3/2007 | Clawson |
| 2007/0112275 | A1 | 5/2007 | Cooke et al. |
| 2007/0116189 | A1 * | 5/2007 | Clawson .................... 379/37 |
| 2007/0201664 | A1 | 8/2007 | Salafia et al. |
| 2009/0168975 | A1 | 7/2009 | Clawson |
| 2009/0191529 | A1 | 7/2009 | Mozingo et al. |
| 2010/0004710 | A1 | 1/2010 | Kellum |
| 2010/0121156 | A1 | 5/2010 | Yoo |
| 2010/0152800 | A1 | 6/2010 | Walker et al. |
| 2010/0198755 | A1 | 8/2010 | Soll et al. |
| 2010/0257250 | A1 | 10/2010 | Salafia et al. |
| 2011/0064204 | A1 | 3/2011 | Clawson |
| 2011/0066002 | A1 | 3/2011 | Clawson |
| 2011/0099031 | A1 | 4/2011 | Nair |
| 2011/0205052 | A1 | 8/2011 | Clawson |
| 2011/0215930 | A1 | 9/2011 | Lee et al. |
| 2012/0183128 | A1 | 7/2012 | Clawson |
| 2012/0210271 | A1 | 8/2012 | Clawson |

FOREIGN PATENT DOCUMENTS

| | | |
|---|---|---|
| JP | 2003-256963 A | 12/2003 |
| JP | 2010-033201 A | 12/2010 |
| KR | 10-2005-0085778 A | 8/2005 |
| KR | 10-2006-0084866 A | 7/2006 |
| KR | 10-2007-0043337 A | 4/2007 |
| KR | 10-2008-0004125 A | 1/2008 |
| WO | WO2006/015229 A2 | 2/2006 |
| WO | WO2008/156876 A1 | 12/2008 |

OTHER PUBLICATIONS

United States Patent Office, Office Action for U.S. Appl. No. 12/588,045, mailed Mar. 22, 2012.

United States Patent Office, Office Action for U.S. Appl. No. 12/558,808, mailed Apr. 23, 2011.
International Search Report and Written Opinion for PCT/US2012/021867 filed Jan. 19, 2012, and mailed Aug. 30, 2012, 9 pgs.
Radosevich, Lynda, "Network holds sway on life, death," Computerworld, v27 n21, May 24, 1993, 2 pgs.
Harris, Roger, "Updated 911 Phone System Top Concern of Residents," Business First—Louisville, v9 n19 s1, Dec. 1992, 3 pgs.
"Geac Completes Software Install," Wireless Week, Nov. 18, 1996, 3 pgs.
"Dictaphone introduces Windows-based Computer-Aided Dispatch (CAD) system," Business Wire, Apr. 23, 1996, 2 pgs. (in commercial use in 1995).
Holroyd, Brian, et al., "Medical Control; Quality Assurance in Prehospital Care," JAMA, the Journal of American Medical Association, v256, n8, Aug. 1986, p. 1027-1031.
CBS web page News Story entitled "911 Operator: 'It's got to be Hell'", Mar. 31, 2006 (excerpts from 911 operators' actions during the attacks on Sep. 11, 2001), 3 pgs.
Best, Wendy, "999 United Emergency services share life-saving Role to boost response," Western Daily Press, WDP Severnside ed., May 27, 1999, 2 pgs.
Poellmitz, William C., "Wireless technology keeps public safety a step ahead," Nation's Cities Weekly, v21 n17, Apr. 27, 1998, 3 pgs.
Crowley, Mark, "Learning from CAD System Implementation," Communications, v29 n8, Aug. 1992, 5 pgs.
Anonymous, "Suburban Chicago towns centralize 911 services," Communications News, v31 n10, Oct. 1994, 2 pgs.
Office Action Summary from USPTO for U.S. Appl. No. 10/255,901 mailed Dec. 31, 2003, 8 pgs.
Office Action Summary from USPTO for U.S. Appl. No. 10/255,901 mailed Oct. 13, 2004, 8 pgs.
Office Action Summary from USPTO for U.S. Appl. No. 10/255,901 mailed Jun. 29, 2005, 7 pgs.
Advisory Action Before the Filing of an Appeal Brief from USPTO for U.S. Appl. No. 10/255,901 mailed Feb. 14, 2006, 3 pgs.
Office Action Summary from USPTO for U.S. Appl. No. 10/255,901 mailed Jun. 7, 2006, 8 pgs.
Office Action Summary from USPTO for U.S. Appl. No. 10/255,901 mailed Feb. 27, 2007, 8 pgs.
Office Action Summary from USPTO for U.S. Appl. No. 10/255,901 mailed Sep. 6, 2007, 9 pgs.
Office Action Summary from USPTO for U.S. Appl. No. 10/255,905 mailed May 19, 2004, 7 pgs.
Office Action Summary from USPTO for U.S. Appl. No. 10/255,905 mailed May 26, 2005, 5 pgs.
Office Action Summary from USPTO for U.S. Appl. No. 10/255,905 mailed Feb. 9, 2006, 8 pgs.
Advisory Action Before the Filing of an Appeal Brief from USPTO for U.S. Appl. No. 10/255,905 mailed Aug. 11, 2006, 3 pgs.
Office Action Summary from USPTO for U.S. Appl. No. 10/255,905 mailed Jan. 30, 2007, 7 pgs.
Notice of Non-Compliant Amendment (37 Cfr 1.121) from USPTO for U.S. Appl. No. 10/255,905 mailed Jul. 9, 2007, 4 pgs.
Office Action Summary from USPTO for U.S. Appl. No. 10/255,905 mailed Oct. 5, 2007, 7 pgs.
Office Action Summary from USPTO for U.S. Appl. No. 09/685,697 mailed Jul. 18, 2003, 8 pgs.
Office Action Summary from USPTO for U.S. Appl. No. 09/685,697 mailed Feb. 3, 2004, 5 pgs.
Office Action Summary from USPTO for U.S. Appl. No. 09/685,697 mailed Jan. 4, 2005, 5 pgs.
Office Action Summary from USPTO for U.S. Appl. No. 09/685,697 mailed Oct. 4, 2005, 7 pgs.
Advisory Action Before the Filing of an Appeal Brief from USPTO for U.S. Appl. No. 09/685,697 mailed Mar. 13, 2006, 4 pgs.
Office Action Summary from USPTO for U.S. Appl. No. 09/685,697 mailed Jun. 26, 2006, 8 pgs.
Office Action Summary from USPTO for U.S. Appl. No. 09/685,697 mailed Apr. 10, 2007, 9 pgs.
Office Action Summary from USPTO for U.S. Appl. No. 09/685,697 mailed Oct. 9, 2007, 11 pgs.
Office Action Summary from USPTO for U.S. Appl. No. 10/140,635 mailed Oct. 3, 2003, 9 pgs.
Office Action Summary from USPTO for U.S. Appl. No. 10/140,635 mailed Jul. 16, 2004, 11 pgs.
Office Action Summary from USPTO for U.S. Appl. No. 10/140,635 mailed Apr. 19, 2005, 11 pgs.
Office Action Summary from USPTO for U.S. Appl. No. 10/140,635 mailed Jan. 17, 2006, 13 pgs.
Office Action Summary from USPTO for U.S. Appl. No. 10/140,635 mailed Sep. 20, 2006, 15 pgs.
Office Action Summary from USPTO for U.S. Appl. No. 10/140,635 mailed Jun. 21, 2007, 15 pgs.
International Search Report for PCT/US2008/054987 filed on Feb. 26, 2008, and mailed on Oct. 8, 2008, 2 pgs.
Written Opinion of the International Searching Authority for PCT/US2008/054987 filed on Feb. 26, 2008, and mailed on Oct. 8, 2008, 9 pgs.
Notification of Transmittal of the International Search Report (2 pgs.) for PCT/US2009/040909, International Search Report, (2 pgs.), and Written Opinion (8 pgs.) mailed from International Searching Authority on Jun. 10, 2009.
International Search Report and Written Opinion for PCT/US09/48577, International filing date Jun. 25, 2009, mailed from ISA Aug. 7, 2009, 9 pgs.
International Search Report and Written Opinion mailed Jan. 19, 2011 in PCT Application No. PCT/US2010/043308, filed Jul. 27, 2010.
International Search Report and Written Opinion mailed Jan. 19, 2011 in PCT Application No. PCT/US2010/043311, filed Jul. 27, 2010.
International Search Report and Written Opinion mailed Feb. 9, 2012 in PCT Application No. PCT/US2011/042582, filed Jun. 30, 2011.
International Search Report and Written Opinion mailed Feb. 9, 2012 in PCT Application No. PCT/US2011/042543, filed Jun. 30, 2011.
International Search Report and Written Opinion PCT/US2010/050402, filed on Sep. 27, 2010, and mailed from ISA on Apr. 27, 2011, 9 pgs.
International Preliminary Report of Patentability for PCT/US2009/048577 filed on Jun. 25, 2009 mailed Oct. 27, 2011, 7 pgs.
International Preliminary Report of Patentability for PCT/US2010/043308 filed on Jul. 27, 2010 mailed Mar. 22, 2012, 6 pgs.
Office Action for U.S. Appl. No. 12/268,963, filed Nov. 11, 2008, mailed from USPTO on Jul. 29, 2011, 18 pgs.

* cited by examiner

ANTI-SOCIAL PROTOCOL FOR EMERGENCY DISPATCH

COPYRIGHT NOTICE

©2011 Priority Dispatch Corp. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

The present disclosure relates to computer systems and methods for providing emergency protocol interrogation, instruction, and dispatch. More specifically, the disclosure is directed to computer-implemented protocols to enable a dispatcher to process emergency calls in an accurate, consistent, and systematic manner by guiding the dispatcher during interrogation and instruction of an emergency caller.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
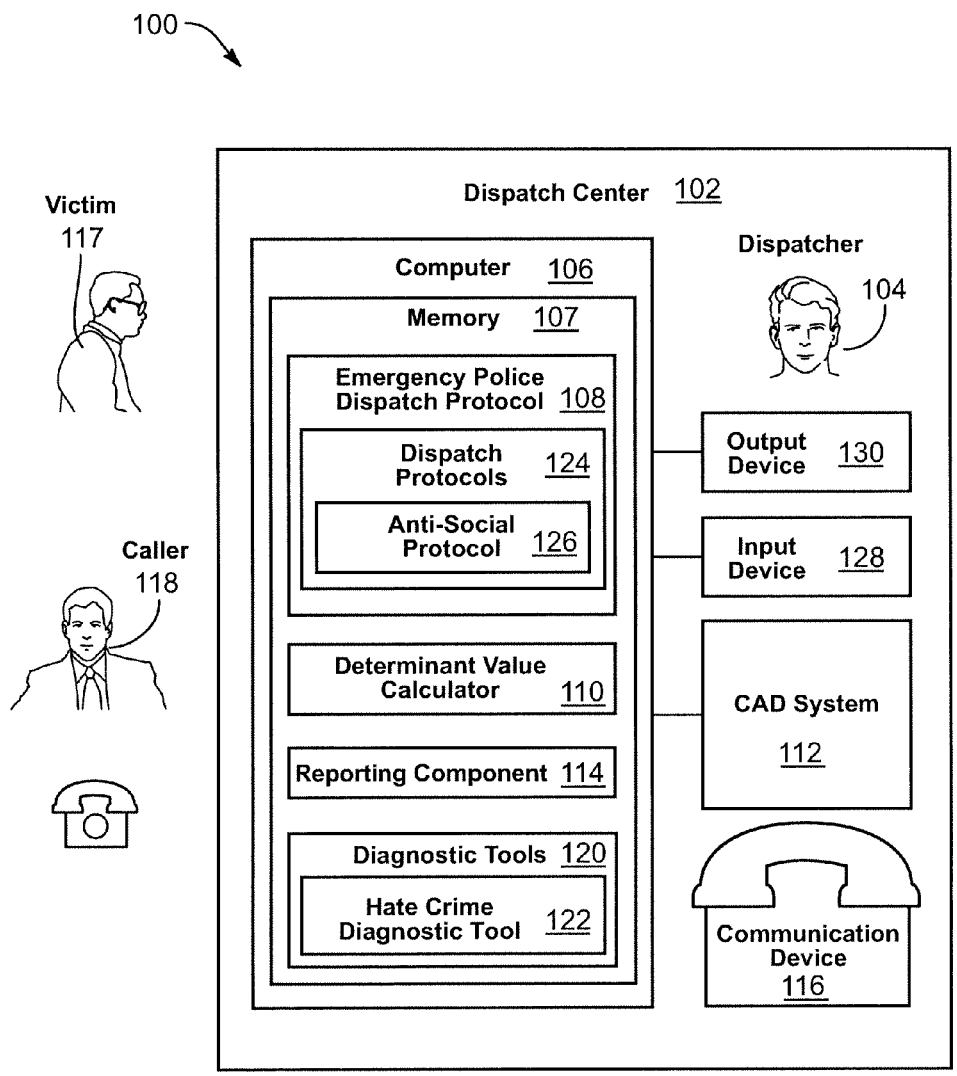
FIG. 1 is a block diagram of an emergency police dispatch system, according to one embodiment.

Criminal acts intended to hurt and intimidate a victim because of their race, ethnicity, national origin, religious views, sexual orientation, or disability are commonly referred to as "hate crimes," "bias crimes," or "bias-motivated crimes." Closely related are other bias-motivated anti-social acts and behavior that, while not criminal, is targeted at a victim based on a bias of the perpetrator against the victim. The perpetrators are known to use explosives, arson, weapons, vandalism, physical violence, and verbal threats of violence to instill fear in their victims. The victims are left vulnerable to more attacks and left feeling alienated, helpless, suspicious, and fearful.

Concern about hate crimes and other bias-motivated anti-social behavior has risen among policymakers in many nations and at all levels of government. The concern about hate crimes and bias-motivated anti-social behavior has become more prevalent in recent years because of greater recognition of the far-reaching effects, beyond the direct impact to the victims. Hate crimes and other bias-motivated anti-social behavior can exacerbate tensions, which can trigger larger community-wide conflict, civil disturbances, and even riots. The community at large may become frustrated and angry if they believe the local government and law enforcement agencies will not protect them. When perpetrators of hate are not prosecuted as criminals and their acts not publicly condemned, their crimes can weaken even those communities or societies with the healthiest pluralism, or tolerance for numerous distinct ethnic, religious, cultural, and other groups.

A core responsibility of government, and specifically law enforcement agencies, is to protect the civil rights of its citizens and to ensure civil relations between various majority and/or minority groups. Identifying and monitoring hate crime activity can be an important component to government fulfilling these responsibilities. However, identifying and gathering statistics on hate crimes and other bias-motivated anti-social behavior, to monitor trends and otherwise track social group tensions in a community, has proven challenging. Identifying and tracking bias-motivated anti-social behavior trends are difficult. Interpretations about bias-motivated anti-social behavior vary and identifying a hate crime and other bias-motivated anti-social behavior can be inherently subjective.

Emergency dispatchers are often an early interface to law enforcement. In their role of receiving emergency calls, a dispatcher is in a unique position to potentially be the first to identify and/or report a hate crime. Moreover, emergency dispatch can be uniquely positioned to gather uniform statistical information concerning hate crimes and other bias-motivated anti-social behavior. Unfortunately, often emergency dispatchers are inexperienced and unskilled, largely due to a high turnover rate among emergency dispatchers.

An automated emergency dispatch system, potentially implemented on a computer, can aid even an unskilled and inexperienced dispatcher in prioritizing emergency calls that are received and in processing the calls to generate an appropriate emergency dispatch response. Regardless of the experience or skill level of the dispatcher, the automated emergency dispatch systems can enable a consistent and predictable emergency dispatch response, despite the diverse aspects of emergency situations that may be reported from one call to the next.

Although an automated emergency dispatch system can enable receiving and processing of widely divergent aspects of emergency situations, these systems may not be well suited for processing particular types of unique situations. More particularly, an automated emergency dispatch system may not be well suited to gather and assess factors that may be indicative of a hate crime and other bias-motivated anti-social behavior. An emergency situation having bias motivations may require considering factors external to the incident being reported. As such, emergency situations involving a hate crime and other bias-motivated anti-social behavior may benefit from particular and more detailed instructions. Additional interrogation, instructions, and/or alternative emergency dispatch procedures or protocols may facilitate gathering information that can be used in identifying a hate crime and other bias-motivated anti-social behavior and in monitoring trends.

Existing automated emergency dispatch systems are not equipped to assist or enable a dispatcher to process an emergency call involving bias-motivated action. A dispatcher with little or no sociological training or experience likely cannot compensate for the shortcomings of an automated emergency dispatch system. Inexperienced and/or unskilled dispatchers are generally unable to properly explore situations such as hate crimes and other bias-motivated anti-social behavior, nor guide a caller to do so. Even highly skilled and experienced dispatchers may have little skill or experience with handling incidents involving bias-motivated anti-social behavior, simply because bias-motivated anti-social behavior may be relatively rare compared to other types of incidents that are reported. Accordingly, the present disclosure provides a method and system for processing of emergency calls involving a hate crime and other bias-motivated anti-social behavior in a rapid, consistent, and predictable manner.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer-executable code located within a memory device and/or computer-readable storage medium. A software module may, for instance, comprise one or more physical or logical blocks of computer instructions, which may be organized as a routine, program, object, component, data structure, etc. that performs one or more tasks or implements particular abstract data types.

In certain embodiments, a particular software module may comprise disparate instructions stored in different locations of a memory storage device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools.

An emergency dispatch system as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and Apple. Alternatively, it is expected that future embodiments will be adapted to execute on other future operating systems. The memory may also store application programs including a Computer Aided Dispatch (CAD) program, an automated emergency dispatch protocol, and a user interface program. The memory may also include data storage. The computer may further include an output device, such as a display unit, for viewing the displayed instructions and inquiries and a user input device for inputting response data.

FIG. 1 is an emergency police dispatch system 100, according to one embodiment. At a dispatch center 102, a dispatcher 104 may operate a computer 106 or other computing device. The computer 106 may include a memory 107 to store protocols, modules, tools, data, etc. The computer 106 may be configured to follow an emergency police dispatch protocol 108 to enable the dispatcher 104 to rapidly and consistently address an emergency incident involving a crime, or otherwise requesting law enforcement, as reported by a caller 118. An emergency call requesting law enforcement may report an incident that may involve a victim 117. As can be appreciated, in some circumstances and/or incidents, the caller 118 is the victim 117. In other instances the caller may be a 2nd party, 3rd party, 4th party, or the suspect (or perpetrator). The emergency police dispatch protocol 108 may include a logic tree, preprogrammed inquiries or questions, possible responses from a caller 118 to the inquiries, and instructions to the caller 118. The responses may route to subsequent preprogrammed inquiries and/or instructions to the caller 118. The emergency police dispatch protocol 108 may also include dispatch protocols 124 for guiding the dispatcher 104 in processing emergency calls involving specific situations and/or incidents. The dispatch protocols 124 may similarly include a logic tree, preprogrammed inquiries or questions, possible responses from a caller 118 to the preprogrammed inquiries, and instructions for the caller 118. The dispatch protocols 124 may include an anti-social protocol 126 for rapid, consistent, and predictable processing of emergency calls involving hate crimes and other bias-motivated anti-social behavior.

The responses of the caller 118 are processed according to predetermined logic of the logic tree of the emergency police dispatch protocol 108. The predetermined logic may enable the emergency police dispatch system 100 to provide to the dispatcher 104 information concerning the correct emergency police dispatch response (e.g., by trained law enforcement officers or agencies and/or other emergency responders). The predetermined logic may also enable the emergency police dispatch system 100 to provide to the dispatcher 104 appropriate post-dispatch instructions for relay to the caller 118 before professional help arrives at the scene. The predetermined logic may also enable the emergency police dispatch system 100 to aid the dispatcher in determining an appropriate priority of the emergency call, including but not limited to a priority of the emergency call relative to other emergency calls and a level of emergency response to provide for the reported incident or situation.

Although an emergency police dispatch system 100 is disclosed and described herein, a person of ordinary skill can appreciate that other emergency dispatch systems and protocols are contemplated, including but not limited to emergency medical dispatch systems and protocols and emergency fire dispatch systems and protocols. Exemplary embodiments of emergency dispatch systems and protocols are disclosed in U.S. Pat. Nos. 5,857,966; 5,989,187; 6,004,266; 6,010,451;

6,053,864; 6,076,065; 6,078,894; 6,106,459; 6,607,481; 7,106,835; 7,428,301; and 7,436,937, which are hereby incorporated herein by reference.

The computer 106 operates a determinant value calculator 110 to calculate a determinant value from the responses of the caller 118 to protocol questions. The determinant value may be selected from a group of pre-established determinant values, such that the emergency responders are familiar with the determinant values and understand the meaning of each and what would be a corresponding emergency response. For example, the determinant values may range, for example, from E-1 for generally very serious emergencies to Ω-2 for generally less serious emergencies. The determinant value may provide a categorization code of the type and level of the incident.

In one embodiment of the present disclosure, the determinant value is a combination of a determinant level (Alpha A, Bravo B, Charlie C, Delta D, Echo E and Omega Ω) and a numeric value. Generally, Ω-2 is the least serious while E-1 is the most serious call. Depending on the determinant level, the appropriate emergency response is dispatched as indicated by the response protocol. For example, an Alpha-A call will typically be responded to by a next available law enforcement unit using the safest arrival method reasonably possible. A Delta-D call will typically be responded to by any or all available law enforcement units proceeding under the most urgent method possible. Echo-E calls typically involve likely immediate life-threatening situations and will be responded to in the most urgent manner available. Bravo-B and Charlie-C calls are intermediate calls that are typically responded to in business-like, orderly manner according to specific department protocol. An Omega-Ω call is generally not specifically responded to, but rather is referred to another person or agency. For the purposes of this disclosure, Echo-E is generally abbreviated as E; Delta-D is generally abbreviated as D; Charlie-C is generally abbreviated as C; Bravo-B is generally abbreviated as B; Alpha-A is generally abbreviated as A; and Omega-Ω is generally abbreviated as Ω. Generally, the lower determinant levels (e.g., numbers) within a determinant classification are more urgent than higher numbers. For example, an emergency dispatch call with a determinant value of D-1 is generally more critical requiring a more urgent response than a call with a determinant value of D-2. However, in some instances, the numeric determinant levels within a determinant value may serve only to identify the type, rather than criticality of the call. Also, if more than one determinant value can be assigned to a particular call, the more critical or higher determinant value is assigned. That is, the call is assigned a criticality determinant value based on the fact or aspect that would lead to the most urgent response. For example, if the call concerns a burglary that occurred over 30 minutes before, but where the suspect remains on the scene or nearby and the caller indicates that he or she is still in danger and feels his or her life is in imminent danger, then the determinant value assigned would be E-1 (due to the imminent danger) rather than D-2 (suspect on scene or nearby) or B-1 (incident occurred over 30 minutes before).

Many calls for law enforcement are not true emergencies, so it is important to prioritize the calls in several ways. First, calls that are true emergencies should be dispatched first. Second, if an agency has units with different capabilities, the emergencies involving more severe problems can be sent units that are more skilled and advanced (e.g., a S.W.A.T. team or bomb squad). And finally, if lights-and-siren are not needed, they should not be used, thereby increasing the safety of all those on the road and in the emergency response vehicles. The computer 106 presents the determinant value to generate an appropriate emergency dispatch response and/or establish the priority of the emergency call. The response may include dispatching professional law enforcement officers or other emergency responders to the scene of the emergency. The protocols used shall have passed through a rigorous review by a panel of experienced law enforcement agents and EMS public safety experts.

The determinant value may be provided to a Computer Aided Dispatch (CAD) system 112, which is a tool that a dispatcher 104 may use to track and allocate emergency response resources for processing emergency calls. The CAD system 112 may manage dispatcher tools for processing emergency calls, including but not limited to the emergency police dispatch protocol 108, communication resources (e.g., radio system, alpha pager), mapping tools (e.g., global positioning system (GPS) technology), and vehicle location systems (e.g., automatic vehicle location (AVL)). The CAD system 112 may operate in whole or in part on a separate computer in communication with the computer 106. In another embodiment, the CAD system 112 operates on the computer 106. The primary information used by the CAD system 112 is location information of both the incident and units, unit availability, and the type of incident. The CAD system 112 may use third party solutions, such as E-911, vehicle location transponders and mobile data terminals (MDT's) for automating the location and availability tasks. The CAD system may also use an emergency police dispatch protocol 108 to facilitate structured call taking for incident interrogation, as previously described.

Although many emergency calls are not true emergencies, all situations can benefit from expert evaluation and pertinent instruction. Prior to the arrival of professional help on-scene, the emergency police dispatch protocol 108 may provide the dispatcher 104 with instructions for the caller 118 that are appropriate to the type of call, whether the call relates to a complaint of vandalism or to a homicide. These instructions may help expedite the work of law enforcement officers and/or other emergency responders.

The computer 106 may also include a reporting component 114 to statistically measure the performance of individual staff and overall performance of the dispatch center 102. These statistics may include compliance rates, call processing statistics, and peer measurements.

The computer 106 may further comprise an input device 128, such as a keyboard, mouse, laser pointer, or other input device, and also an output device 130, such as a display monitor. The input device 128 receives input from a user (generally a dispatcher) and provides the input to the emergency police dispatch system 100. The input may be provided to the computer 106, the emergency protocol 108, the diagnostic tool 120, and/or the CAD system 112. An output device 130 receives output from the emergency police dispatch system 100 and displays or otherwise provides the output to the user. In another embodiment, the input device 128 and output device 130 are provided by the CAD system 112.

The dispatch center 102 includes a communication device 116 (e.g., telephone equipment) to answer emergency calls. A call into the dispatch center 102 from a caller 118 may initiate creation of an emergency call incident. The dispatcher 104 identifies the call as requiring an emergency police dispatch, and the emergency police dispatch protocol 108 is accessed. The protocol 108, including the dispatch protocols 124, may provide questions and/or instructions that are expertly drafted to assist a novice caller 118 in reporting aspects of the incident, and/or assessing a situation of a victim 117. The protocol 108 may also provide expertly drafted instructions to assist a victim 117 prior to the arrival of trained law enforcement and/or emergency responders. The instructions may be vocally relayed by the dispatcher 104 to the caller 118 over the communication device 116.

Some protocol inquiries or questions may be readily answerable by the caller 118, whereas others may be more difficult to answer. Certain diagnostic inquiries may be difficult for the untrained caller to determine or may be difficult to answer under the stress of an emergency situation. Accordingly, in addition to instructions, the emergency police dispatch system 100 may provide one or more computer-implemented diagnostic tools 120. The diagnostic tools 120 may greatly improve information collection and intervention for emergency medical response situations and aid in saving lives.

A diagnostic tool 120 may aid the dispatcher 104 and/or the caller 118 (via instructions from the dispatcher 104) in assessing a situation of a victim 117. A diagnostic tool 120 may also be an interventional tool, providing instructions that direct a caller 118 to intervene, or take action, to aid a victim 117, or otherwise change the circumstances or conditions of an emergency situation. For sake of clarity, diagnostic tools and interventional tools are both referred to herein generally as diagnostic tools. Accordingly, a diagnostic tool 120, as referred to herein, may provide diagnostic instructions, interventional instructions, or both diagnostic and interventional instructions. Whether a diagnostic tool 120 provides merely diagnostic instructions, merely interventional instructions, or both diagnostic and interventional instructions, the diagnostic tool provides consistent and reliable instruction, information gathering, and/or timing for a particular emergency situation.

The diagnostic tools 120 are computer implemented software modules that enable a dispatcher 104 to provide consistent, expert advice to assist a caller with regards to a particular aspect of an emergency situation, such as determining a vital sign. One benefit of the diagnostic tools 120 is the computer-aided timing of techniques to determine the vital signs. In highly stressful conditions, the diagnostic tools 120 provide a necessary resource to reading critical signs. The diagnostic tools 120 may be stored in the memory of the computer 106 and initiated and executed as required. The diagnostic tools 120 may be embodied as computer-executable software applications and associated data.

The emergency police dispatch protocol 108, including the dispatch protocols 124, also may call on one or more diagnostic tools 120 to assist with an inquiry and may route to the appropriate diagnostic tool 120 when needed. When directed according to the protocol, the emergency police dispatch protocol 108 may automatically, i.e., without dispatcher intervention, initiate the appropriate diagnostic tool 120. This may occur when the emergency police dispatch protocol 108 arrives at a diagnosis or assessment step in the logic tree. The emergency police dispatch system 100 may also allow the dispatcher 104 the option to call upon a diagnostic tool 120 as desired. Icons may be displayed in a tool bar or other convenient location on a user interface to allow the dispatcher 104 to initiate a corresponding diagnostic tool 120. One particular diagnostic tool 120 discussed herein may be a hate crime diagnostic tool 122, an example of which is described in U.S. patent application Ser. No. 13/026,043, filed by the same inventor on Feb. 11, 2011, which is hereby incorporated herein by reference.

The hate crime diagnostic tool 122 may be configured as a surveillance tool to collect information in order to identify patterns, trends, and geographical clusters of hate crimes. The hate crime diagnostic tool 122 is configured to facilitate consistent, uniform collection of information, such that the information is gathered in substantially the same manner and seeking substantially the same set of information for all cases, regardless of the skill or experience of the dispatcher. The gathered information is uniform and quantifiable and can be appropriately measured or compared against other data gathered in a similar manner.

The information gathered by the hate crime diagnostic tool 122 can be used by law enforcement agencies to attempt to track hate crimes and trends occurring in a particular community or region. The information gathered by the hate crime diagnostic tool 122 can be stored for tracking purposes and also communicated to law enforcement agencies and other emergency response agencies to alert them of the potential for bias motivation in the incident to which they are responding, so that they can take any potential precautionary measures. The information can also be communicated to the emergency police dispatch protocol 108, including the dispatch protocols 124, for use in determining appropriate questions and/or instructions to provide to the dispatcher 104.

The hate crime diagnostic tool 122 may be launched from within, or at least in conjunction with, the progression of the emergency police dispatch protocol 108 and dispatch protocols 124, including the anti-social protocol 126, to enhance and supplement emergency call processing facilitated by the emergency police dispatch protocol 108. The hate crime diagnostic tool 122 may be launched automatically by the emergency police dispatch protocol 108, or launched manually by a dispatcher 104.

Figure 2:
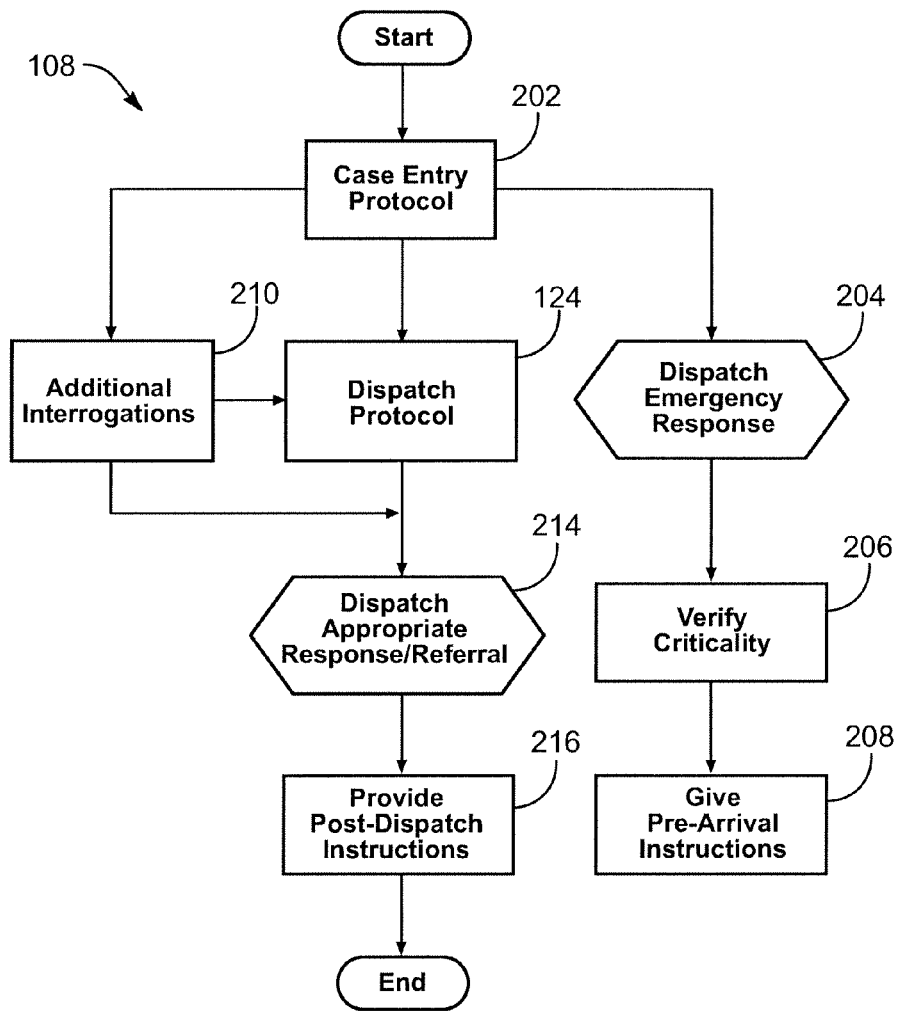
FIG. 2 is a flow diagram of an emergency police dispatch protocol of an emergency police dispatch system, according to one embodiment.

FIG. 2 is a high-level flow diagram of an emergency police dispatch protocol 108 of an emergency police dispatch system, according to one embodiment. The protocol 108 may begin with a case entry protocol 202 that guides the dispatcher in gathering initial information. One aim of the case entry protocol 202 is to obtain sufficient information from the caller to permit identification of a chief complaint. Also, the case entry protocol 108 may be considered a primary interrogation because all calls may be processed through the case entry protocol 202 to gather initial incident information. The information received through the case entry protocol 202 may include a location of the incident, a call-back number in the event the call is disconnected, the caller's name, and a description of the incident.

If the dispatcher receives and enters information that an incident is especially critical (e.g., a caller in imminent danger, a sinking vehicle, a vehicle in rising flood water, and a stuck accelerator and cannot stop vehicle), for whatever reason, an emergency response is dispatched 204 immediately, before continuing with any further interrogation or instructions. The dispatched 204 emergency response may be a maximum emergency response, including properly trained law enforcement officers. The criticality of the incident 206 is verified and pre-arrival instructions are given 208. The pre-arrival instructions can be tailored to the specific incident and/or situation. Typically, a result of properly conveyed (by the dispatcher) and executed (by the caller) pre-arrival instructions may be a more calm, stable situation at the time the law enforcement emergency responders arrive. The pre-arrival instructions may aid to ensure safety and improve the effectiveness of the dispatched 204 emergency response.

If the dispatcher receives information from the caller to confirm the incident is not critical (e.g., not an imminent danger), but the dispatcher lacks sufficient information to proceed directly to a dispatch protocol 124, the emergency police dispatch protocol 108 may shunt to additional inquiries 210 designed to guide the dispatcher to gather information from the caller to enable the dispatcher to ascertain the chief complaint. If the chief complaint is determined, the emergency police dispatch protocol 108 may shunt to the appropriate dispatch protocol 124 for dealing with that chief complaint.

The dispatch protocol 124 may guide the dispatcher through a secondary interrogation focusing on the chief complaint. The dispatch protocol 124 may present a pre-scripted interrogation to enable a more orderly and detailed understanding of the incident that can be communicated to law enforcement emergency responders. The pre-scripted interrogation may include preprogrammed inquiries focused on gathering information relating to the chief complaint. The preprogrammed inquiries provided by the dispatch protocol 124 may be termed "Key Questions" for the particular situation or condition of the chief complaint. The preprogrammed inquiries presented may depend on caller responses. Dispatch protocols 124, in general, are discussed in greater detail below with reference to FIG. 4. The heart of the instant disclosure is a dispatch protocol 124 for processing an emergency call involving a potential hate-crime or other bias-motivated anti-social behavior, namely an anti-social protocol 126. The anti-social protocol 126 will be discussed in greater detail below with reference to FIGS. 5, and 6A-6D.

During the dispatch protocol 124, the dispatcher and/or the emergency police dispatch protocol 108 will gather information about the circumstances of the incident or emergency situation, discovered through interrogation, and may dispatch 214 an appropriate emergency dispatch response. The dispatch protocol 124 facilitates uniform and consistent gathering of information relating to the emergency and dispatching of an appropriate emergency dispatch response. The appropriate emergency dispatch response may be determined through a system of assigning determinant values as the protocol progresses (i.e., traverses) through a logic tree. The determinant values, as described above, may range, for example, from E-1 for generally very serious emergencies to Ω-2 for generally less serious emergencies. In another embodiment, the determinant values may range from, for example, E-1 for generally very serious emergencies to A-2 for generally less serious emergencies. In still another embodiment, the determinant values may range differently, such as for example from A-1 for generally very serious emergencies to E-5 for generally less serious emergencies.

After the appropriate emergency dispatch response has been sent (e.g., law enforcement officers), the dispatcher may remain on the telephone with the caller to provide post-dispatch instructions 216 regarding what to do, and what not to do, prior to the arrival of law enforcement officers. The post-dispatch instructions 216 help to stabilize the situation, and to expedite the work of law enforcement officers at the scene. Post-dispatch instructions may include, for example, "do not disturb anything at the scene, including weapons, tools, or objects found nearby," "stay on the line and I'll tell you exactly what to do next," and the like.

Figure 3:
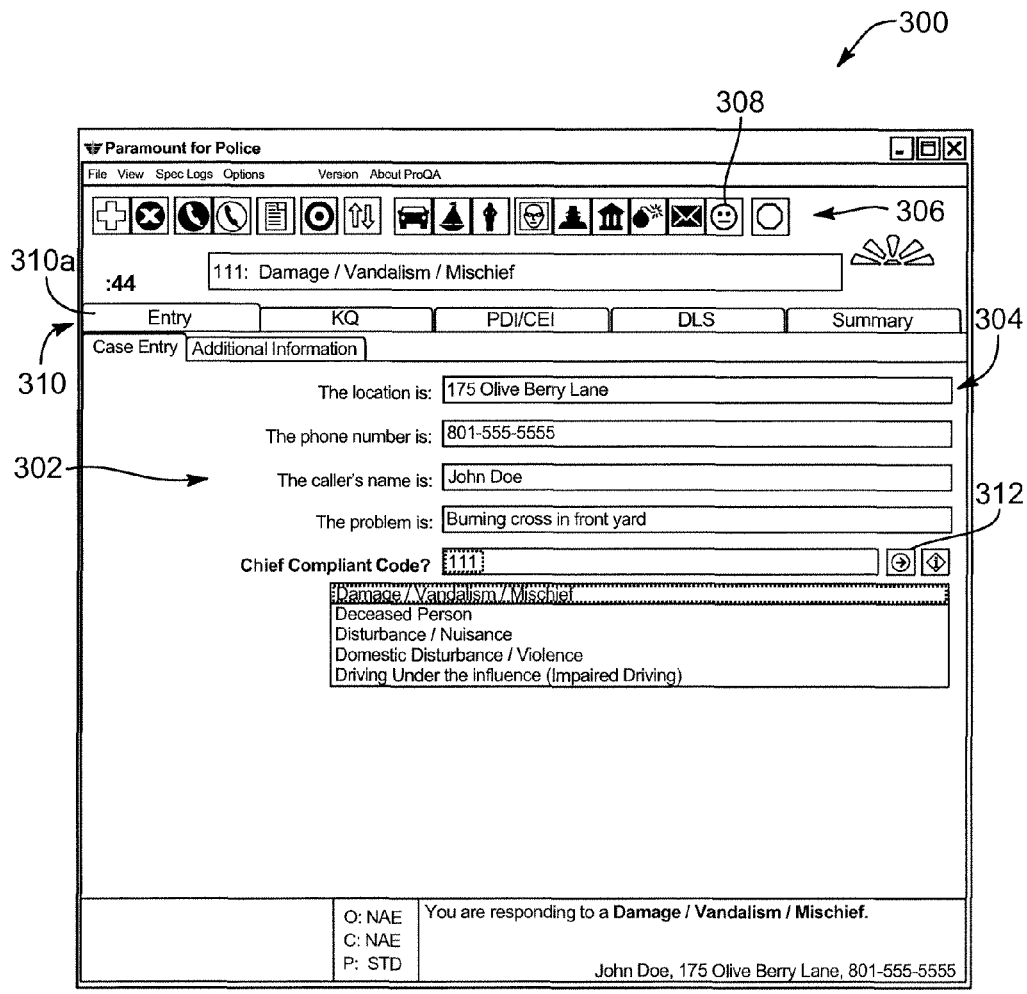
FIG. 3 is a user interface of an emergency police dispatch system, according to one embodiment.

FIG. 3 is a user interface 300 of an emergency police dispatch system, according to one embodiment. The emergency police dispatch system user interface 300 allows a dispatcher to interface with the emergency police dispatch protocol. The illustrated user interface 300 is shown traversing a case entry protocol 202 of the emergency police dispatch protocol 108 (described above with reference to FIG. 2). The emergency police dispatch protocol may present inquiries 302 (or questions) via the emergency police dispatch system user interface 300. The inquiries 302 are provided for the dispatcher to relay to the caller to gather information regarding the reported incident or emergency. The dispatcher and/or the emergency police dispatch system may gather the information in the form of caller responses to the inquiries 302. The dispatcher may input the responses of the caller to the inquiries into response fields 304 provided by the user interface 300. The response fields 304 may include, for example, any of a number of appropriate input field types, including but not limited to text fields, text boxes, menus, drop down menus, drop-down selection boxes, lists, buttons, check boxes, and radio buttons. The response fields 304 may correspond to information indicative of one or more responses of the caller to the inquiries 302.

The caller responses are relayed from the caller to the dispatcher, typically over the telephone. Information from the caller responses may be input into the system by the dispatcher and may be used by the emergency police dispatch protocol to determine subsequent inquiries 302 and instructions to present to the dispatcher. The caller response information may indicate the caller's observations of the incident and/or current situation. The emergency police dispatch system may use the caller response information to generate an emergency police dispatch response by properly trained law enforcement officers. The information gathered from the caller responses may be used by the determinant value calculator to calculate a determinant value that can be communicated to the emergency responders. Additional details relating to emergency police dispatch protocols and user interfaces to interact with the same can be found in the earlier referenced U.S. patents. In addition, similar concepts are discussed below in relation to a dispatch protocol, and in particular an anti-social protocol, with reference to FIGS. 4, 5, and 6A-6D.

The user interface 300 may further comprise tabs 310 to aid in organizing and/or compartmentalizing various aspects of processing a call. The tabs 310 may include a tab 310a for presenting a case entry protocol portion of an emergency police dispatch protocol (e.g., "Entry" tab). Other tabs may include a tab for presenting a dispatch protocol portion of the emergency police dispatch protocol (e.g., a "KQ" tab or Key Questions tab), a tab for presenting post-dispatch instructions and/or critical EMD information (e.g., a "PDI/CEI" tab), a tab for dispatching life support (e.g., a "DLS" tab), and a tab summarizing the call and/or processing of the call (e.g., "Summary" tab). The KQ tab is discussed below with reference to FIGS. 6A-6D.

The user interface 300 may provide an input component 312 for the dispatcher to indicate when the portion of the emergency police dispatch protocol presented by the tab 310 has been completed. The input component 312 may be a navigation button, as illustrated in FIG. 3, to enable a dispatcher to provide input that indicates to the user interface 300 that the dispatcher is ready to proceed to a next phase of the emergency police dispatch protocol.

The emergency police dispatch system user interface 300 may also provide one or more diagnostic tool launch inputs 306. As illustrated, one or more buttons may be provided on the user interface as diagnostic tool launch inputs 306. As will be appreciated by a person of ordinary skill, the diagnostic tool launch inputs 306 may comprise a component other than a button, including familiar user interface components such as a drop down menu, a drop down selection box, a list, a check box, and a radio button. The diagnostic tool launch inputs 306 enable the dispatcher to launch a particular diagnostic tool. Although the emergency police dispatch protocol may automatically initiate a diagnostic tool based on dispatcher-entered input indicative of one or more responses of the caller, the diagnostic tool launch inputs 306 provide a way for the dispatcher to manually (i.e., anytime, at the dispatcher's discretion) initiate a diagnostic tool. In FIG. 3, a hate crime diagnostic tool launch input 308 is provided. The hate crime diagnostic tool launch input 308 comprises a button on the emergency police dispatch system user interface 300. The button may include, for example, an icon or a symbol, such as a green circle with eyes and a mouth as shown, to indicate that the button is the hate crime diagnostic tool launch input 308, which manually initiates a hate crime diagnostic tool.

Figure 4:
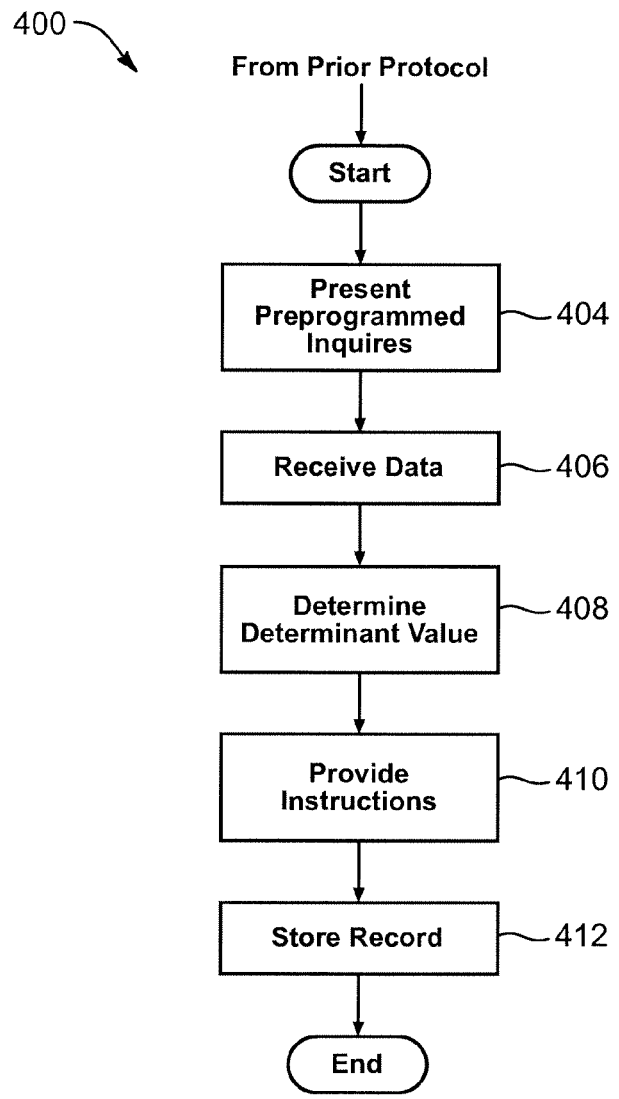
FIG. 4 is a high-level flow diagram of a method of a dispatch protocol for an emergency dispatch system, according to one embodiment.

FIG. 4 is a high-level flow diagram of a method 400 implemented by a dispatch protocol 124 (FIG. 1) for an emergency dispatch system, according to one embodiment. The dispatch protocol may be an anti-social protocol, an example of which is described in greater detail below with reference to FIGS. 5 and 6A-6D. The dispatch protocol facilitates uniform and consistent gathering of information relating to the reported chief complaint. Generally, but not always, the dispatch protocol initializes from a prior protocol. The prior protocol may be a case entry protocol. In some instances the prior protocol may be a different dispatch protocol, from which a determination was made to shunt to a more appropriate dispatch protocol. The determination to shunt may be made automatically by the prior protocol or manually by the dispatcher. For a call involving a hate crime or other bias-motivated anti-social behavior, the appropriate dispatch protocol may be an anti-social protocol, such as the anti-social protocol described below with reference to FIGS. 5 and 6A-6D.

The dispatch protocol may present 404 preprogrammed inquiries according to a pre-scripted interrogation. The preprogrammed inquiries may also be referred to as "Key Questions," targeted to ascertain the criticality of the incident or situation and typically are based on the chief complaint. Data is received 406 from the dispatcher, as relayed from the caller, following the preprogrammed inquiries asked to the caller by the dispatcher. The data received 406 may correspond to caller responses to the preprogrammed inquiries. The data may be used to determine subsequent questions, or to determine instructions to provide to the dispatcher. The received data is also used by the protocol to determine 408 a determinant value. Intermediate determinant values may be produced as information is received and processed, and the final determinant value may be determined after all information is received and processed.

The dispatch protocol may provide 410 appropriate instructions to be relayed to the caller by the dispatcher. The instructions may comprise post-dispatch instructions for the caller to help stabilize or otherwise ameliorate a situation and to expedite the work of law enforcement officers at the scene. In one embodiment, the dispatch protocol 124 is an anti-social protocol 126. A database may be accessed to produce appropriate instructions. Records of the calls are stored 412 for historical reports, for review and analysis of dispatcher performance, and for continued quality assurance control. A record of a call may include, but is not limited to inquiries, responses, and determinant values.

Figure 5:
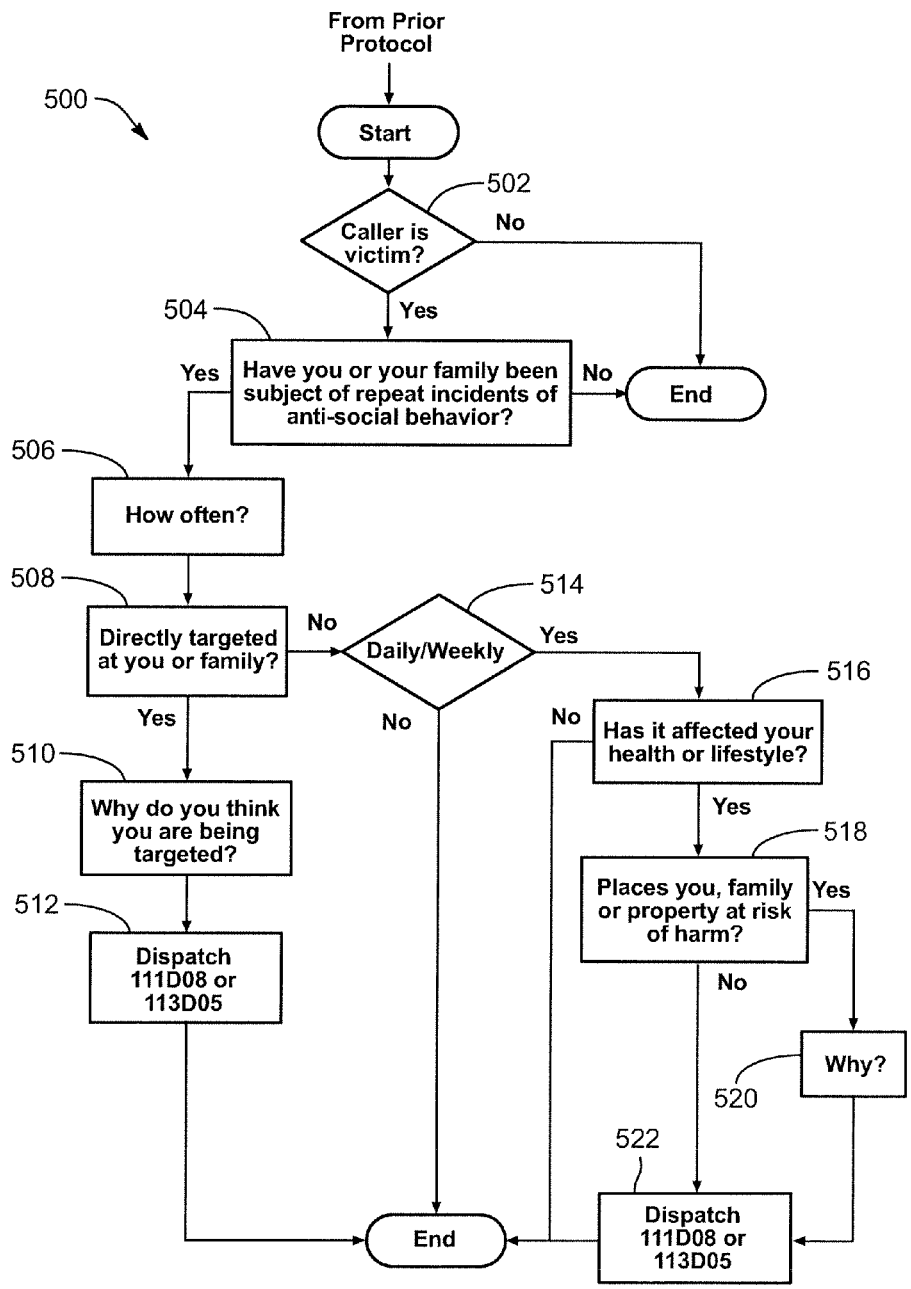
FIG. 5 is a flow diagram of a method of an anti-social protocol for an emergency dispatch system, according to one embodiment.

FIG. 5 is a detailed flow diagram of a method 500 implemented by an anti-social protocol 126 (FIG. 1) for an emergency dispatch system, according to one embodiment. The anti-social protocol is initialized, typically, from a prior protocol. In particular, the anti-social protocol may be included with and/or augment or supplement one or more other dispatch protocols. For example, in the illustrated embodiment, the anti-social protocol may be included with and/or may supplement a damage and vandalism dispatch protocol and/or a disturbance and nuisance dispatch protocol. As can be appreciated, the anti-social protocol may be accessed a variety of ways. In another embodiment, the anti-social protocol may initialize once the emergency dispatch protocol has traversed all or a portion of a case entry protocol and shunts to the anti-social protocol as the appropriate dispatch protocol for handling the chief complaint of the call. Also, an emergency police dispatch protocol may automatically shunt to the anti-social protocol upon receiving indication that a hate crime or other bias-motivated anti-social behavior is being reported.

The anti-social protocol may present to the dispatcher a series of preprogrammed inquiries. The preprogrammed inquiries may be considered a part of a pre-scripted interrogation that is based on a logic tree of the anti-social protocol 126. (The flow diagram of FIGS. 5A-5C may be considered to portray a logic tree, according to one embodiment). The preprogrammed inquiries that are presented as part of a pre-scripted interrogation may depend on dispatcher-entered input as will be described. A pre-scripted interrogation may be considered to be a set of preprogrammed inquiries presented according to traversal of a path along the logic tree.

During a pre-scripted interrogation, the anti-social protocol may receive input from the dispatcher corresponding to instructions and preprogrammed inquiries, as was explained above with reference to FIG. 4. The input may be received substantially in real-time, as the dispatcher provides the input. Alternatively, or in addition, the input may be received from the emergency police dispatch system because information sought by the anti-social protocol 126 may have previously been obtained from the dispatcher via the case entry protocol and/or another dispatch protocol 124. Alternatively, or in addition, the input may be received from a diagnostic tool 120, such as the hate crime diagnostic tool 122. While explicit steps of receiving information are not depicted in FIG. 5, an ordinarily skilled artisan will recognize that input may be received at various points in the method 500 of the anti-social protocol.

The dispatcher-entered input relates to the emergency call and/or the reported incident. The dispatcher-entered input may affect the path along which the logic tree is traversed. Various paths through one embodiment of a logic tree of an anti-social protocol 126 will now be described, including the corresponding preprogrammed inquiries and potential dispatcher-entered input that may be considered.

As the anti-social protocol begins, a determination 502 is made whether the caller is the victim. Information regarding whether the caller is the victim, a 2nd party, a 3rd party, a 4th party, or a suspect may have been previously gathered as part of the case entry protocol or as part of an earlier dispatch protocol, such as the damage and vandalism dispatch protocol or the disturbance and nuisance dispatch protocol. In another embodiment, where the anti-social protocol is distinct and separate from other dispatch protocols, the anti-social protocol may also present a preprogrammed inquiry to the dispatcher (which may be relayed to the caller) inquiring what party the caller is and present options such as "2nd party," "3rd party," "4th party," or "Suspect." If the caller is not the victim, then the anti-social protocol may end.

If the caller is the victim, the dispatcher may be presented 504 a preprogrammed inquiry, "Have you or your family been subject of repeat incidents of anti-social behavior?," to relay to the caller. The preprogrammed inquiry 504 may be presented by a user interface of the emergency police dispatch system and/or the anti-social protocol. If the input entered is "no," to indicate caller's answer is "no," the questioning ends and the method 500 of the anti-social protocol ends.

If the caller is the victim, the dispatcher may be presented 506 a preprogrammed inquiry, "How often?," to obtain information if the caller has been a victim of anti-social behavior, for example, "Daily," "Weekly," "Monthly," or "Less often." The dispatcher may be presented 508 a preprogrammed inquiry, "Has it been directly targeted at you or your family?" If the caller answers "Yes," the dispatcher may be presented 510 a follow-up preprogrammed inquiry, "Why do you think you are being targeted?" A determinant value may be set, for example to 111D08 (if the anti-social protocol is proceeding in conjunction with or supplementing a damage and vandalism dispatch protocol) or to 113D05 (if the anti-social protocol is proceeding in conjunction with or supplementing a disturbance and nuisance dispatch protocol), and an appropriate emergency response (e.g., law enforcement personnel) may be dispatched 512 based on the set determinant value. Then the method 500 of the anti-social protocol may end.

If the caller responds to the preprogrammed inquiry 508 that, no, the anti-social behavior has not been directly targeted (and the dispatcher provides corresponding input to the anti-social protocol), information gathered in response to preprogrammed inquiry 506 may be used to determine 514 if the anti-social behavior toward the caller is occurring daily or weekly. If the determination 514 is that the anti-social behavior is not happening daily or weekly, then the method 500 of the anti-social protocol may end. If the determination 514 is that the anti-social behavior toward the caller is happening as frequently as daily or weekly, the dispatcher may present 516 a preprogrammed inquiry, "Has it affected your health or lifestyle?" If the caller responds to the preprogrammed inquiry 516 that, no, the anti-social behavior has not affected health or lifestyle, the anti-social protocol 126 may end. Alternatively, if the caller responds to the preprogrammed inquiry 516, "Yes," the dispatcher may be presented 518 a follow-up preprogrammed inquiry, "Does the anti-social behavior place you, your family or your property at risk of harm?" If the caller's answer is, "Yes," the dispatcher may be presented 520 still another follow-up preprogrammed inquiry, "Why?" Also, a determinant value may be set, for example, to 111D08 (if the anti-social protocol is proceeding in conjunction with or supplementing a damage and vandalism dispatch protocol) or to 113D05 (if the anti-social protocol is proceeding in conjunction with or supplementing a disturbance and nuisance dispatch protocol), and an appropriate response is dispatched 522 based on the set determinant value. Then the method 500 of the anti-social protocol 126 may end.

As can be appreciated, some or all of the information gathered by the pre-scripted interrogation (e.g., preprogrammed inquiry 512) of the anti-social protocol may not be used, for example, in calculating a determinant value. Similarly, some or all the information may not be communicated to the emergency responder law enforcement officers. However, the information gathered may be used, or stored for later use, by law enforcement and/or emergency dispatch services, for example, to identify bias-motivated anti-social behavior patterns and trends, which can illuminate a community response to reduce hate crimes and other bias-motivated anti-social behavior.

In another embodiment, the determinant value may be modified with a suffix, such as a suffice 'H' to further communicate to emergency responders that the emergency and/or incident to which the emergency response is being dispatched. For example, a determinant value "111D08" may be modified to "111D08H" in situations where the incident involves a hate crime or other bias-motivated anti-social behavior.

As can also be appreciated, the spelling and/or sentence structure of the preprogrammed inquiries may vary according to the geographic location or region where the emergency police dispatch system and/or anti-social protocol 126 may be deployed. For example, the phrase "anti-social behavior" may, in the United Kingdom, be spelled using the true English spelling (with a 'u'), for example, "anti-social behaviour."

FIGS. 6A-6D are a user interface 300 of an emergency police dispatch system at various points as the emergency police dispatch system presents a pre-scripted interrogation, traversing one path of a logic tree of an anti-social protocol, according to one embodiment. As previously explained above, with reference to FIG. 3, the emergency police dispatch system user interface 300 allows a dispatcher to interface with the emergency police dispatch protocol. In particular, in the illustrated embodiment, the user interface 300 is facilitating traversal of an anti-social protocol.

The user interface 300 presents one or more tabs 310, including a tab 310b (e.g., a key questions or "KQ" tab) that is configured to present preprogrammed inquiries (e.g., key questions) as part of a pre-scripted interrogation of a dispatch protocol. The particular questions presented may depend on the dispatch protocol, in this case the anti-social protocol, and the path along a logic tree of the dispatch protocol that may be traversed based on caller responses to the preprogrammed inquiries, as explained above with reference to FIG. 5. Typically, but not always, the user interface 300 will present a tab 310b (e.g. a Key Questions or "KQ" tab) upon completion of the case entry protocol on tab 310a (i.e., the "Entry" tab"). If sufficient information is available to identify a chief complaint, the emergency police dispatch protocol may shunt to an appropriate dispatch protocol. In this case, the emergency police dispatch protocol has shunted to the damage and vandalism protocol, the user interface presented tab 310b and initialized the damage and vandalism protocol, traversed the damage and vandalism protocol, and initiated the anti-social protocol as part of, or to supplement, the damage and vandalism protocol. As can be appreciated, the anti-social protocol can be initiated as part of, or to supplement, other dispatch protocols, such as a disturbance and nuisance protocol.

Figure 6A:
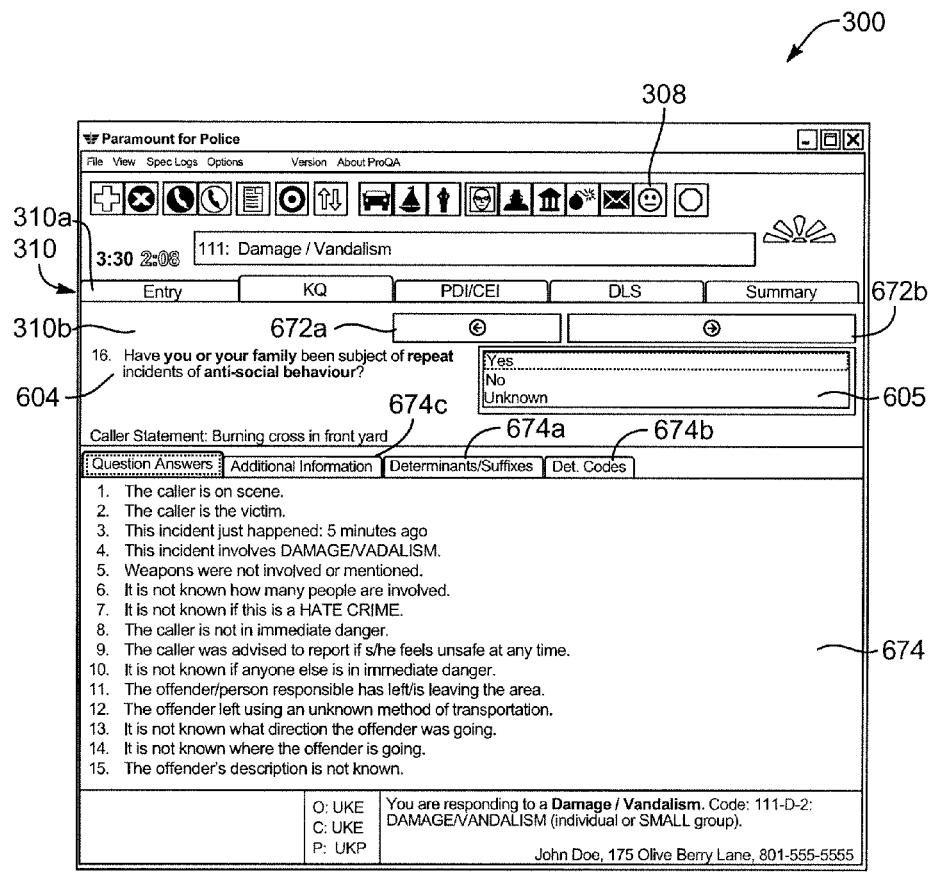
FIGS. 6A-6D are a user interface of an emergency police dispatch system, at various points, as the emergency police dispatch system traverses one path of a logic tree of an anti-social protocol for an emergency dispatch system.

FIG. 6A illustrates the user interface 300 presenting a preprogrammed inquiry 604 "Have you or your family been subject of repeat incidents of anti-social behaviour?" for the dispatcher to relay to the caller. An input field 605 enables the dispatcher to quickly and easily enter input indicative of the caller's response to the preprogrammed inquiry 604. In the illustrated embodiment, the input field 605 provided is a list box presenting a list of acceptable inputs. As will be appreciated, the input field 605 may be any of a number of appropriate input field types, including but not limited to text fields, text boxes, menus, drop down menus, drop-down selection boxes, lists, buttons, check boxes, and radio buttons. In FIG. 6A, the list of acceptable inputs may include "No," "Yes," and "Unknown." In FIG. 6A, the input "No," is presently selected.

The user interface 300 may present navigation buttons 672a, 672b to enable the dispatcher to indicate to the user interface to navigate back or forward, respectively, in the emergency dispatch protocol. The dispatcher can select the forward navigation button 672b to indicate to the user interface 300 that the dispatcher is ready to proceed in the protocol. The dispatcher can select the back navigation button 672a to go back in the protocol. Accordingly, when the dispatcher selects the forward navigation button 672b, the protocol advances and the user interface 300 may present a next instruction and/or preprogrammed inquiry.

The user interface 300 may also present diagnostic tool launch inputs, including a hate crime diagnostic tool launch input 308. As described previously, the hate crime diagnostic tool launch input 308 may enable a dispatcher to manually launch a hate crime diagnostic tool at any point during the emergency police dispatch protocol, including during a dispatch protocol such as an anti-social protocol.

The user interface 300 may also present an answers pane 674 to display input received in relation to previous instructions and/or preprogrammed inquiries. For example, the answers pane 674 of FIG. 6A displays the dispatcher-entered input provided for multiple previously presented preprogrammed inquiries and/or instructions presented by a damage and vandalism protocol; e.g., "1. The caller is on scene. 2. The caller is the victim . . . 15. The offender's description is not known." The answers pane 674 enables a dispatcher to quickly review previous responses for accuracy and to thereby improve understanding of the situation and/or incident reported by the caller. If the dispatcher were to inadvertently select an incorrect input in the input field 605, the dispatcher can readily recognize the error in the answers pane 674 and navigate back in the protocol by selecting the back navigation button 672a and then select a correct input. Other panes may also be available for presentation to a dispatcher, to provide additional information relating to processing a given emergency call, including a "Determinant/Suffixes" pane 674a, a "Determinant Codes" pane 674b, and an "Additional Information" pane 674c.

Figure 6B:
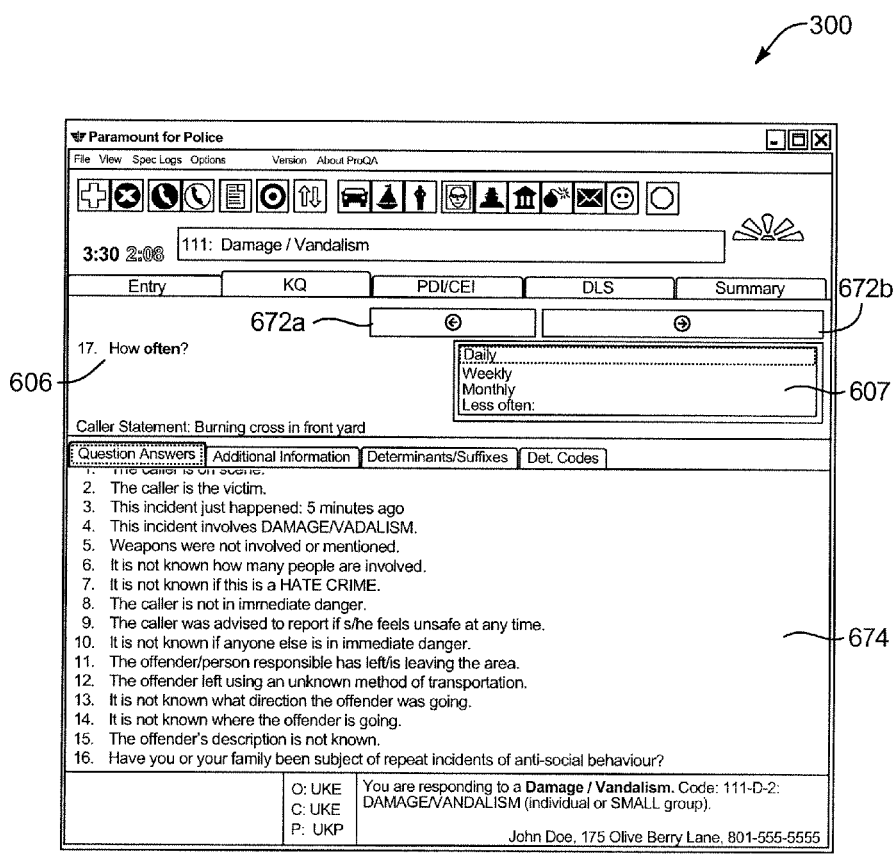

FIG. 6B illustrates the user interface 300 presenting a preprogrammed inquiry 606 "How often?" for the dispatcher to relay to the caller. An input field 607 enables the dispatcher to enter input indicative of the caller's response to the preprogrammed inquiry 606. In the illustrated embodiment, the input field 607 provided is a list box presenting a list of acceptable inputs. As will be appreciated, the input field 607 may be any of a number of appropriate input field types, including but not limited to text fields, text boxes, menus, drop down menus, drop-down selection boxes, lists, buttons, check boxes, and radio buttons. In FIG. 6B, the list of acceptable inputs may include "Daily," "Weekly," "Monthly," and "Less often." As before, the answers pane 674 may display previously entered input, including "16. The victim or her/his family have been subject of repeat incidents of anti-social behaviour." Accordingly, the dispatcher selected the input "Yes" in input field 605 (FIG. 6A) in response to preprogrammed inquiry 604 (FIG. 6A).

The dispatcher can select the navigation button 672b to indicate to the user interface 300 that the dispatcher is ready to proceed in the protocol. The dispatcher can select the navigation button 672a to go back in the protocol.

Figure 6C:
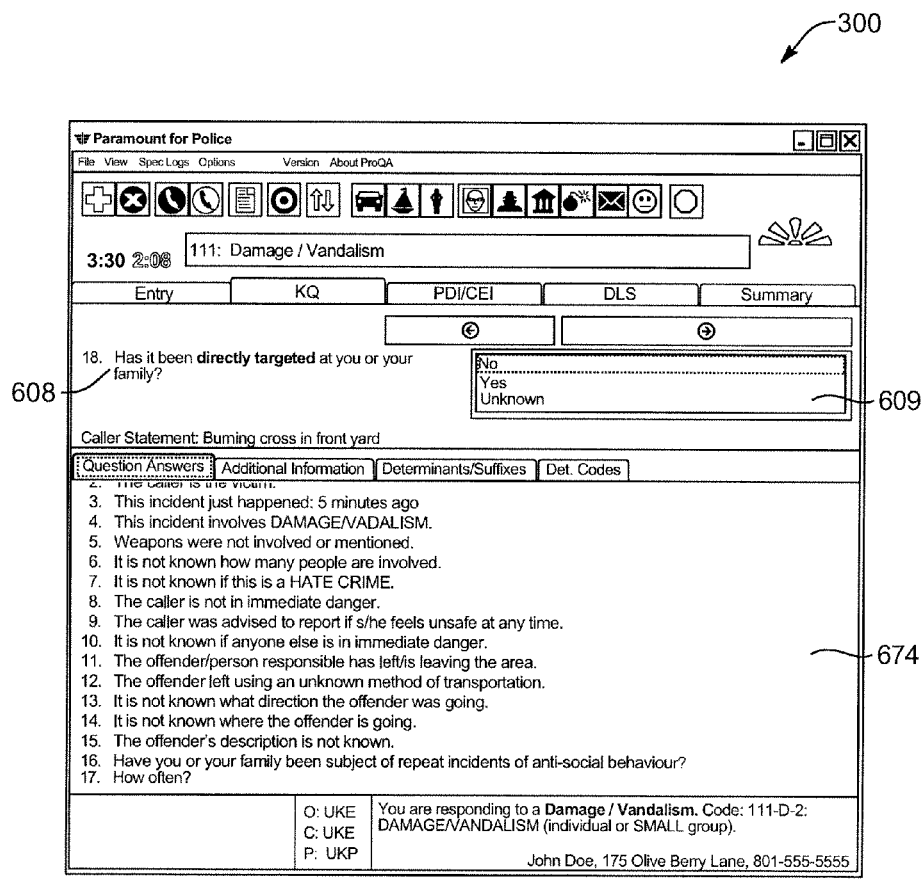

FIG. 6C illustrates the user interface 300 presenting a preprogrammed inquiry 608 "Has it been directly targeted at you or your family?" for the dispatcher to relay to the caller. An input field 609 enables the dispatcher to enter input indicative of the caller's response to the preprogrammed inquiry 608. In the illustrated embodiment, the input field 609 provided is a list box presenting a list of acceptable inputs. As will be appreciated, the input field 609 may be any of a number of appropriate input field types, including but not limited to text fields, text boxes, menus, drop down menus, drop-down selection boxes, lists, buttons, check boxes, and radio buttons. In FIG. 6C, the list of acceptable inputs may include "No," "Yes," and "Unknown." As before, the answers pane 674 may display previously entered input, including "17. Incidents of anti-social behaviour occurred daily." Accordingly, the dispatcher selected the input "Daily" in input field 607 (FIG. 6B) in response to preprogrammed inquiry 606 (FIG. 6B). The dispatcher can select the navigation button 672b to indicate to the user interface 300 that the dispatcher is ready to proceed in the protocol. The dispatcher can select the navigation button 672a to go back in the protocol.

Figure 6D:
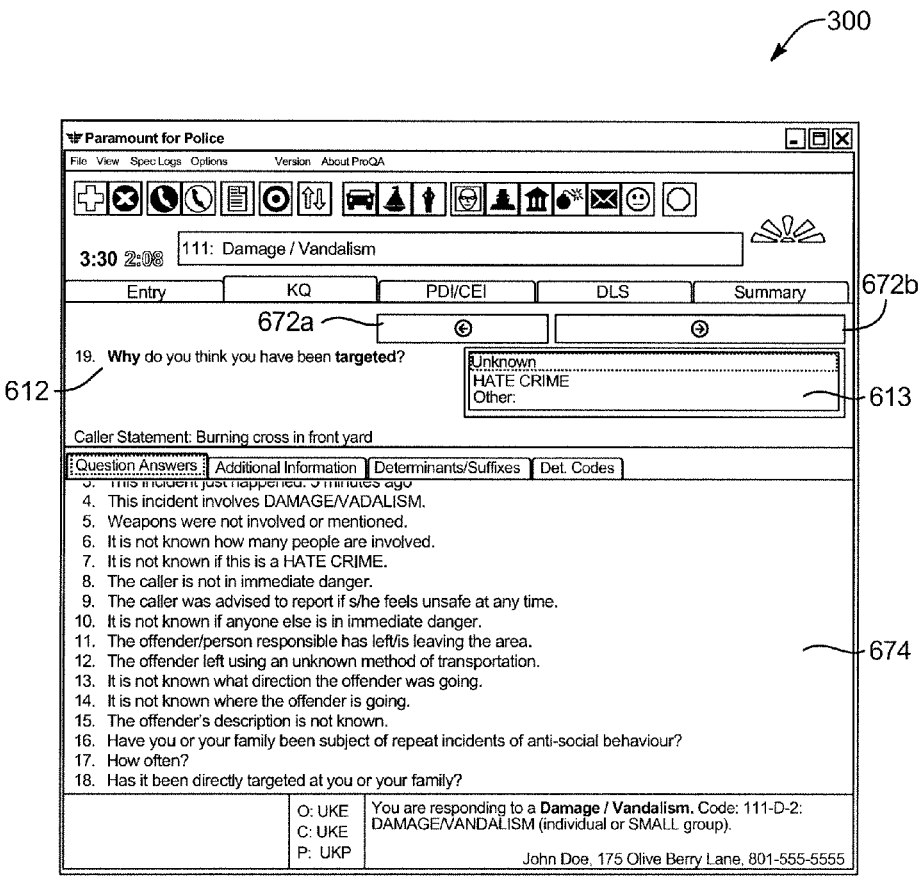

FIG. 6D illustrates the user interface 300 presenting a preprogrammed inquiry 612 "Why do you think you're being targeted?" for the dispatcher to relay to the caller. An input field 613 enables the dispatcher to enter input indicative of the caller's response to the preprogrammed inquiry 612. In the illustrated embodiment, the input field 613 provided is a list box presenting a list of acceptable inputs. As will be appreciated, the input field 613 may be any of a number of appropriate input field types, including but not limited to text fields, text boxes, menus, drop down menus, drop-down selection boxes, lists, buttons, check boxes, and radio buttons. In FIG. 6D, the list of acceptable inputs may include "Unknown," "HATE CRIME," and "Other." As before, the answers pane 674 may display previously entered input, including "18. It has been directly targeted at the victim or her/his family." Accordingly, the dispatcher selected the input "Yes" in input field 609 (FIG. 6C) in response to preprogrammed inquiry 608 (FIG. 6C). The dispatcher can select the navigation button 672b to indicate to the user interface 300 that the dispatcher is ready to proceed in the protocol. The dispatcher can select the navigation button 672a to go back in the protocol.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A computer-implemented method to guide a dispatcher when communicating vocally with a caller via a communication device regarding an incident involving bias-motivated anti-social behavior targeted at a victim and for dispatching an emergency dispatch response to the incident, the computer-implemented method comprising:

presenting, on a dispatch center computer device, a pre-scripted interrogation comprising a plurality of preprogrammed inquiries for the dispatcher to ask the caller in order to systematically obtain a description of the incident involving the bias-motivated anti-social behavior targeted at the victim, wherein the description of the incident comprises caller responses to the plurality of preprogrammed inquiries, and wherein the preprogrammed inquiries of the pre-scripted interrogation include asking whether the victim or the victim's family have been a subject of repeat incidents of anti-social behavior, asking how often the repeat incidents of anti-social behavior toward the victim have occurred, asking if the repeat incidents of anti-social behavior have been directly targeted at one of the victim and the victim's family;

receiving, on the dispatch center computer device, dispatcher-entered input representative of caller responses to the preprogrammed inquiries of the pre-scripted interrogation;

determining automatically on the dispatch center computer device a determinant value from one of a plurality of pre-established determinant values based on dispatcher-entered input representative of caller responses to the preprogrammed inquires; and generating an emergency dispatch response by emergency responders based on the determinant value.

2. The computer-implemented method of claim 1, wherein presenting a pre-scripted interrogation further comprises the dispatch center computer device traversing a path of a logic tree as the pre-scripted interrogation progresses, the logic tree configured to determine the preprogrammed inquiries to present as part of the pre-scripted interrogation based on caller responses to the preprogrammed inquiries.

3. The computer-implemented method of claim 1, further comprising providing preprogrammed inquiries to the dispatcher via a user interface on an output device of the dispatch center computer device.

4. The computer-implemented method of claim 1, further comprising providing preprogrammed inquiries to the dispatcher on a medium readable by the dispatcher.

5. The computer-implemented method of claim 1, wherein determining a determinant value includes determining from dispatcher-entered input whether the caller is the victim.

6. The computer-implemented method of claim 1, wherein the caller is the victim.

7. The computer-implemented method of claim 1, wherein the pre-scripted interrogation further comprises a plurality of preprogrammed inquiries for the dispatcher to ask the caller in order to systematically obtain a description of an incident involving damage or vandalism.

8. The computer-implemented method of claim 1, wherein the pre-scripted interrogation further comprises a plurality of preprogrammed inquiries for the dispatcher to ask the caller in order to systematically obtain a description of an incident involving disturbance or nuisance.

9. The computer-implemented method of claim 1, further comprising providing post-dispatch instructions to the caller.

10. A computer system to guide a dispatcher when communicating with a caller vocally via a communication device regarding an incident involving bias-motivated anti-social behavior targeted at a victim and for dispatching an emergency response to the incident, the computer system comprising:
    a processor;
    an output device in communication with the processor;
    an input device in communication with the processor;
    a memory in communication with the processor, the memory comprising:
        an anti-social protocol comprising a logic tree that is configured to determine one of a plurality of pre-established determinant values, the anti-social protocol configured to
            present on the output device a pre-scripted interrogation comprising a plurality of preprogrammed inquiries for the dispatcher to ask the caller in order to systematically obtain a description of the incident involving the anti-social behavior toward the victim, wherein the description of the incident comprises caller responses to the plurality of preprogrammed inquiries, and wherein the preprogrammed inquiries of the pre-scripted interrogation include
                asking whether the victim or the victim's family have been a subject of repeat incidents of anti-social behavior,
                asking how often the repeat incidents of anti-social behavior toward the victim have occurred,
                asking if the repeat incidents of anti-social behavior have been directly targeted at one of the victim and the victim's family;
            receive, via the input device, dispatcher-entered input corresponding to caller responses to the preprogrammed inquiries of the pre-scripted interrogation, and
            determine automatically on the dispatch center computer device a determinant value from one of a plurality of pre-established determinant values based on dispatcher-entered input representative of caller responses to the preprogrammed inquires, wherein the determinant value specifies an appropriate emergency dispatch response.

11. The computer system of claim 10, wherein said preprogrammed inquiries of the pre-scripted interrogation are according to a path along the logic tree that is traversed based on responses to the preprogrammed inquiries and.

12. The computer system of claim 10, the memory further comprising a user interface that is displayed on the output device and configured to facilitate presentation of preprogrammed inquiries and to facilitate receiving dispatcher-entered input.

13. The computer system of claim 10, wherein determining a determinant value includes determining from dispatcher-entered input whether the caller is the victim.

14. The computer system of claim 10, wherein the caller is the victim.

15. The computer system of claim 10, wherein the pre-scripted interrogation further comprises a plurality of preprogrammed inquiries for the dispatcher to ask the caller in order to systematically obtain a description of an incident involving damage or vandalism.

16. The computer system of claim 10, wherein the pre-scripted interrogation further comprises a plurality of preprogrammed inquiries for the dispatcher to ask the caller in order to systematically obtain a description of an incident involving disturbance or nuisance.

17. The computer system of claim 10, the memory further comprising a hate crime diagnostic tool.

18. The computer system of claim 10, the memory further comprising a case entry protocol.

19. A non-transitory computer-readable storage medium having stored thereon computer-readable instruction code for a dispatch center computer to perform a method to assist a dispatcher when communicating vocally with a caller via a communication device regarding an incident involving bias-motivated anti-social behavior targeted at a victim, the method comprising:
    presenting on a dispatch center computer device a pre-scripted interrogation comprising a plurality of preprogrammed inquiries for the dispatcher to ask the caller to systematically obtain a description of the incident, the description of the incident comprising caller responses to the plurality of preprogrammed inquiries, wherein the dispatch center computer device includes a logic tree configured to determine the preprogrammed inquiries of the pre-scripted interrogation and automatically determine one of a plurality of pre-established determinant values based on dispatcher-entered input representative of caller responses to the preprogrammed inquires, and wherein the plurality of preprogrammed inquiries of the pre-scripted interrogation include
        asking whether the victim or the victim's family have been a subject of repeat incidents of anti-social behavior,
        asking how often the repeat incidents of anti-social behavior toward the victim have occurred,
        asking if the repeat incidents of anti-social behavior have been directly targeted at one of the victim and the victim's family;
    receiving dispatcher-entered input on the dispatch center computer device representative of caller responses to the preprogrammed inquiries of the pre-scripted interrogation;
    assigning on the dispatch center computer device the pre-established determinant value determined by the logic tree and the pre-scripted interrogation; and
    generating an emergency dispatch response based on the assigned pre-established determinant value.

\* \* \* \* \*